W. L. MANN.
SPRING WHEEL.
APPLICATION FILED JUNE 29, 1914.
1,114,161.
Patented Oct. 20, 1914.
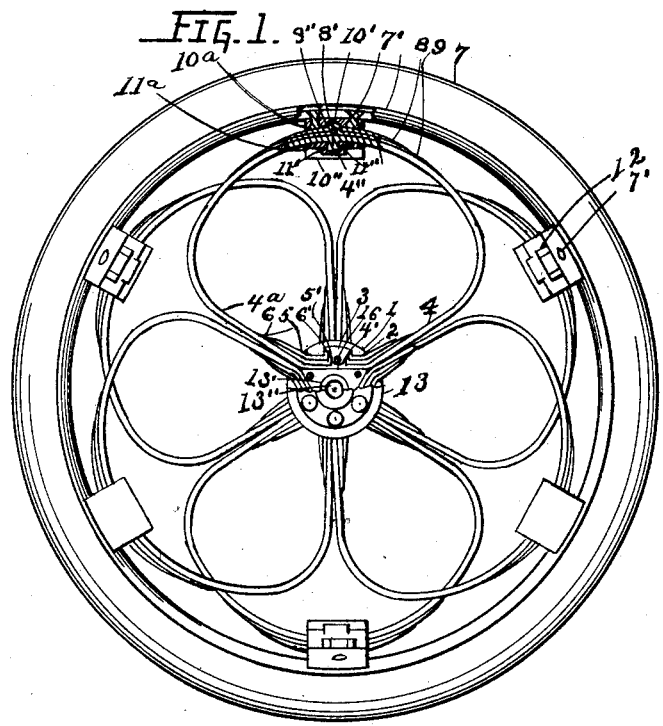
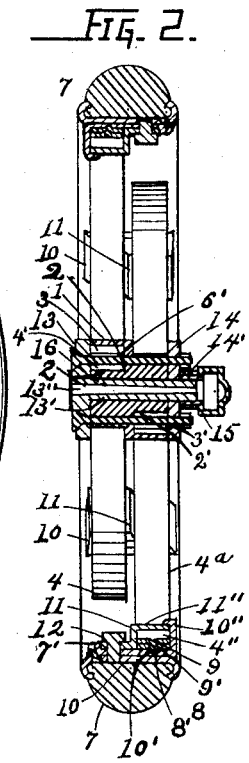
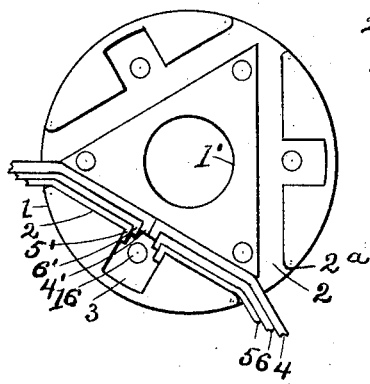
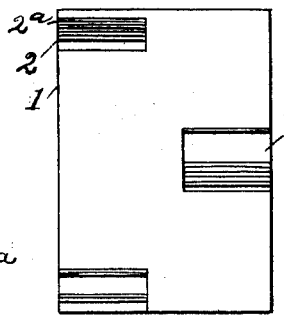
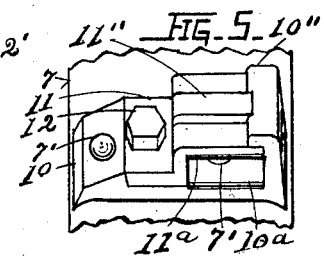
WITNESSES:
INVENTOR
William L. Mann
BY George W. Hinton
ATTORNEY

UNITED STATES PATENT OFFICE.

WILLIAM L. MANN, OF ST. JOSEPH, MISSOURI.

SPRING-WHEEL.

1,114,161.  Specification of Letters Patent.  Patented Oct. 20, 1914.

Application filed June 29, 1914. Serial No. 847,920.

*To all whom it may concern:*

Be it known that I, WILLIAM L. MANN, a citizen of the United States, residing at St. Joseph, in the county of Buchanan and State of Missouri, have invented certain new and useful Improvements in Spring-Wheels, of which the following is a specification, reference being had therein to the accompanying drawing.

My invention relates to improvements in that class of spring wheels that are used on vehicles, and the objects of my improvements are; first to make the bodies of the spokes of such simple form, that the same shall be extremely cheap in cost of manufacture, each of which is formed of one separate spring, easily and quickly removed and replaced, and which is interchangeable in the wheel as to position; second, to so construct the rim securing means and the hub, that the ends of the spokes shall be held rigidly secured therein, and in such position that the spokes shall not be subjected to any twisting strain or torque, due to their position; thus providing a spring wheel in which the durability and resilience are brought to the maximum, with the minimum of expense and labor. I attain these objects by the mechanism illustrated in the accompanying drawings, in which:—

Figure 1 is a side elevation of the wheel, certain parts being broken away to avoid obscurity. Fig. 2 is a vertical section of the wheel cut longitudinally through the center of the hub. Fig. 3 is an end or face view of the central hub section. Fig. 4 is a side view of the central hub section. Fig. 5 is a view in perspective of the rim securing means, showing the parts enlarged, in detail.

Referring to Figs. 2, 3 and 4, hub 1 has a plurality of straight channels 2 formed in the outer end face thereof, and a holding channel 3, the inner end of which opens into the central portion of channel 2. In the opposite end face of said hub is formed a plurality of similarly formed channels 2', each of which in like manner is provided with a holding channel 3'. The outer channels 2 are arranged in a series around said hub, for the even spacing of the hereinafter described spring spokes, while the inner channels 2' are arranged intermediately for similarly spacing the inner spokes as hereinafter described. Said spokes are each formed of one piece of spring metal, preferably steel as seen at 4, in Fig. 1, and are secured in pairs both at the rim and in the hub, as hereinafter described, and since each pair of spokes is alike, a detailed description of one pair is sufficient.

The inner end of spoke 4 is provided preferably with a plurality of inner leaf springs 5 and 6 for distributing the strain thereon. The inner end of spoke 4 has inner flange 4' formed thereon and overlapped on the inner end of leaf spring 5 which latter has leaf flange 5' formed on the inner end thereof, said flange being overlapped upon the end of leaf spring 6, which in turn has its leaf flange 6' formed on its inner end; the last mentioned leaf flange being overlapped on one side by the wall of the holding channel 3, while the inner end portions of said spoke and leaf springs are placed in one end portion of channel 2. Said spoke 4 extends radially from said hub for a predetermined distance and thereafter extends in a curve to a point radially even with the beginning of said spoke, and near rim 7. The extended or outer end of said spoke has outer spoke flange 4'' formed thereon for engagement with the hereinafter described rim securing means. The reversely placed spoke, 4ª is like spoke 4 both in construction and operation and is therefore not described in detail. The inner end of spoke 4ª is abutted against the inner end of spoke 4, while its outer end is in like manner abutted against the outer end of said spoke 4. The outer end portions of said spokes are reinforced by leaf springs 8 and 9, the central portions of which overlap the abutted ends of said spokes. Said leaf spring 8 has boss 8' formed on the center of its outer surface, which is seated in a depression 10', formed in clip body 10, which latter is riveted on rim 7, by rivets 7'. Leaf spring 9, in like manner, is provided with boss 9', seated in a depression formed in spring 8, which arrangement of bosses hold said leaf springs against longitudinal movement.

Clip body 10 has hook 10'' formed thereon, beneath which, one end of clip yoke 11 is inserted, while the opposite end of said yoke is secured on body 10, by cap screw 12, passed therethrough and screwed into said clip body, for holding the outer ends of spokes 4 and 4ª, and the leaf springs 8 and 9 securely in place.

Clip yoke 11 has channel 11' formed in its inner face, in which spoke flanges 4'' are inserted for holding the outer ends of spokes 4 and 4ᵃ against longitudinal movement.

The hook secured end of boss 11″, formed on clip yoke 11, is inset into hook 10″, for similarly holding said yoke; thus providing rim securing means, whereby the ends of said spokes and the central portions of said leaf springs are rigidly secured on rim 7.

The inner ends of said spokes are held in hub slot 2, by inner hub section 13, which also holds the inner end portions of inner leaf springs 5 and 6 in place. Said section has sleeve 13′ formed thereon and inserted in sleeve aperture 1′ formed through hub 1. Said sleeve has spindle aperture 13″ formed through the center thereof.

Outer spokes 4ᵃ are similarly secured in their respective hub slots 2′, (see Fig. 4,) by outer hub section 14, (see Fig. 2,) which is passed over and onto the outer end of sleeve 13′. Said section 14 has the externally threaded cap sleeve 14′ formed thereon, onto which the internally threaded cap nut 15 is screwed. Said section, the hub 1 and inner section 13 are secured together by bolts and nuts 16; thus forming rigid hub securing means, whereby the inner ends of all of said spokes and their respective inner leaf springs are detachably secured in said hub.

From the foregoing, and reference to the drawings, it will be seen and understood, that all of the described spokes and their respective leaf springs and securing means are in two even alinements; thereby providing an arrangement of the same, which permits free flexing of the spokes and leaf springs, without torque or lateral strain upon them. The ends of hub slots 2 outwardly spread at 2ᵃ, (see Figs. 3 and 4,) provide varying points for the beginning of the flexing of their respective spokes and leaf springs, which prevents crystallizing and cracking of the same at these places. The same is true in regard to the rim securing means, seen in Fig. 5, wherein the body and yoke have their corners rounded at 10ᵃ and 11ᵃ respectively.

While I have shown rim 7 with a rubber tire 17 secured thereon it is evident that any other kind of tire with any other suitably formed rim could be used without departing from the spirit of my invention, which I reserve the right to do.

Having fully described my invention, what I claim as new, and desire to secure by Letters Patent is:—

1. In a spring wheel provided with a rim and a hub therefor; a pair of spring spokes each spoke being of practically semi-oval form and having their ends abutted against each other to form practically an oval; spoke flanges formed on the abutted ends of said spokes; a plurality of leaf springs for each one of the inner ends of said spokes; leaf flanges formed on the inner ends of said leaf springs; spoke securing means whereby said leaf springs and the inner ends of said spokes are detachably secured in said hub; a plurality of outer leaf springs for reinforcing the outer end portions of said spokes; leaf holding means formed on said leaf springs; rim securing means secured on said rim, said securing means being provided with leaf engaging means formed therein for engaging said leaf holding means; and flange holding means in said rim securing means whereby the flanged outer ends of said spokes are detachably held in place.

2. In a spring wheel, a hub having a sleeve aperture formed through the center thereof, said hub having a plurality of spoke channels formed therein, the adjacent ends of said channels uniting in one common opening through the annular surface of said hub while one side of said plurality of channels opens through the end face of said hub the entire length thereof; a holding channel for each one of said spoke channels, said holding channel being formed radially in said hub and having its inner end opening into the central portion of said spoke channel; a hub section covering the open sides of said channels and section securing means whereby said hub section is detachably secured on said hub.

3. In a spring wheel, an annular hub having a sleeve aperture formed through the center thereof and also having flat faces formed on its two ends, said hub having an outer series of spoke channels formed in the outer one of said flat faces the adjacent ends of said spoke channels uniting in one common opening through the annular surface of said hub, said hub also having a holding channel formed in said outer face for each one of said spoke channels, said holding channel being formed radially in said hub and having its inner end opening into the central portion of its respective spoke channel, said hub also having an inner series of spoke channels and holding channels of similar form and arrangement formed in its inner end face; an outer hub section covering said outer spoke channels and their holding channels said section having a sleeve aperture formed therethrough; a cap sleeve formed on the outer surface of said outer hub section, said cap sleeve having a cap nut thereon; an inner hub section covering said inner series of spoke channels and their holding channels; a sleeve formed on said inner hub section said sleeve being inserted in the sleeve apertures of said hub and of said outer section; and securing means whereby said hub sections and said hub are detachably secured together.

4. In a spring wheel, provided with a rim and a hub therefor; a spring spoke; an outer flange on the outer end of said spoke; securing means whereby the inner end of said spoke is secured in said hub; another similarly formed and secured spoke having its outer and inner ends respectively abutted against said spoke; a clip body fitted to and secured on the inner surface of said rim said body having leaf engaging means formed in its upper surface; leaf springs reinforcing the outer ends of said spokes; leaf securing means formed on said leaf springs the same being in engagement with said leaf engaging means; a hook formed on said clip body said hook being projected over an end portion of said body; a clip yoke having a channel formed in a portion of its inner surface for receiving therein the flanged outer ends of said spokes; and yoke securing means whereby said yoke is secured on said clip body with the channeled end of said yoke engaged by said hook.

5. In a spring wheel, a hub having a spoke channel formed in the end face thereof, the ends of said channel opening through the annular surface of said hub, said end face also having a holding channel formed therein the inner end of which opens into the central portion of said spoke channel; a plurality of leaf springs the inner end portions of which are inserted in an end portion of said spoke channel the outer ends extending therefrom through said spoke channel opening; leaf flanges formed on the inner ends of said leaf springs one of said leaf flanges being engaged by one side of said holding channel while the remainder of said leaf flanges are overlapped behind the inner end of the first mentioned leaf spring; a spring spoke having its inner end portion inserted in said channel portion; said spoke extending therefrom through said channel opening; a spoke flange formed on said inner spoke end, said spoke flange being overlapped behind the inner end of one of said leaf springs; a similarly arranged and formed spoke and plurality of leaf springs reversely placed in the remaining end portion of said spoke channel with the inner ends of said spokes abutted against each other; securing means whereby all of said spokes and leaf springs are secured in place; a rim for said wheel; and rim securing means whereby the outer ends of said two spokes are secured to said rim.

In testimony whereof I affix my signature in the presence of two witnesses.

WILLIAM L. MANN.

Witnesses:
EARL J. KEASBY,
W. P. JUSTICE.

---

Copies of this patent may be obtained for five cents each, by addressing the "Commissioner of Patents, Washington, D. C."